US 8,537,980 B2

(12) United States Patent
Frazier et al.

(10) Patent No.: US 8,537,980 B2
(45) Date of Patent: Sep. 17, 2013

(54) CONVERSATION SUPPORT (75) Inventors: Kristopher T. Frazier, Frisco, TX (US);
Heath Stallings, Colleyville, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 542 days.

(21) Appl. No.: 12/412,555

(22) Filed: Mar. 27, 2009

(65) Prior Publication Data
US 2010/0246784 A1    Sep. 30, 2010

(51) Int. Cl.
*H04M 11/00* (2006.01)

(52) U.S. Cl.
USPC ................................ 379/88.11; 379/88.16

(58) Field of Classification Search
USPC ............ 379/67.1, 88.16, 88.11, 88.12, 88.13; 704/251
See application file for complete search history.

(56) References Cited

U.S. PATENT DOCUMENTS

| | | | | |
|---|---|---|---|---|
| 5,303,361 A * | 4/1994 | Colwell et al. ........................ 1/1 |
| 6,741,586 B1 * | 5/2004 | Schuster et al. .............. 370/352 |
| 6,859,213 B1 * | 2/2005 | Carter .......................... 715/752 |
| 7,039,170 B1 * | 5/2006 | Sylvain ....................... 379/93.23 |
| 8,223,932 B2 * | 7/2012 | Forbes et al. ............... 379/93.23 |
| 2005/0053207 A1 | 3/2005 | Claudatos et al. |
| 2005/0283475 A1 * | 12/2005 | Beranek et al. ..................... 707/6 |
| 2006/0067497 A1 * | 3/2006 | Erhart et al. ............. 379/201.01 |
| 2007/0091169 A1 | 4/2007 | Zhang et al. |
| 2008/0107100 A1 | 5/2008 | Begeja et al. |
| 2008/0240379 A1 * | 10/2008 | Maislos et al. ............. 379/88.13 |
| 2009/0003540 A1 * | 1/2009 | Zafar ......................... 379/88.11 |
| 2009/0046677 A1 | 2/2009 | Toledano et al. |
| 2009/0232288 A1 | 9/2009 | Forbes et al. |
| 2009/0252305 A1 * | 10/2009 | Rohde et al. ............... 379/88.13 |
| 2010/0177877 A1 * | 7/2010 | Hamaker et al. ........... 379/88.14 |
| 2010/0254521 A1 * | 10/2010 | Kriese et al. ............... 379/88.14 |
| 2011/0013756 A1 * | 1/2011 | Davies et al. .............. 379/88.14 |

OTHER PUBLICATIONS

Co-pending U.S. Appl. No. 12/335,033, filed Dec. 15, 2008, entitled "Conversation Mapping", by Kristopher T. Frazier et al., 44 pages.

* cited by examiner

*Primary Examiner* — Olisa Anwah (57) ABSTRACT

A method may include receiving, at a first device associated with a first party, communications from a second device. The communications may be associated with a communication session that includes an audio conversation, a text-based conversation or a multimedia conversation. The method may also include identifying a word or phrase from the communication session and retrieving, from a memory included in the first device, information associated with the word or phrase. The method may further include outputting, to a display associated with the first device, the retrieved information.

12 Claims, 6 Drawing Sheets

CONVERSATION SUPPORT

BACKGROUND INFORMATION

During communications (e.g. phone calls, chat sessions, etc.) with another party, one party may describe an event, such as a recent vacation, sporting event or meeting, that he/she has attended. Describing the event verbally or via text, however, often leaves the other party without sufficient details needed to fully understand what is being described, or merely provides the other party with a vague idea of the event.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to monitoring conversations between parties or other communications involving one or more parties. In one exemplary implementation, as the parties are communicating, items related to the context of the communications may be retrieved. For example, as one party is describing a recent event he/she has attended, content associated with the event, such as digital pictures, an audio file, a data file, etc., may be automatically retrieved and provided to the other party in real-time during the communication session. In some implementations, the party describing the event may selectively choose whether to send all or a portion of the retrieved content to the other party. In another exemplary implementation, context-related content may be provided to a user interacting with an automated system, such as a voicemail system, an interactive voice response (IVR) system, etc.

Figure 1:
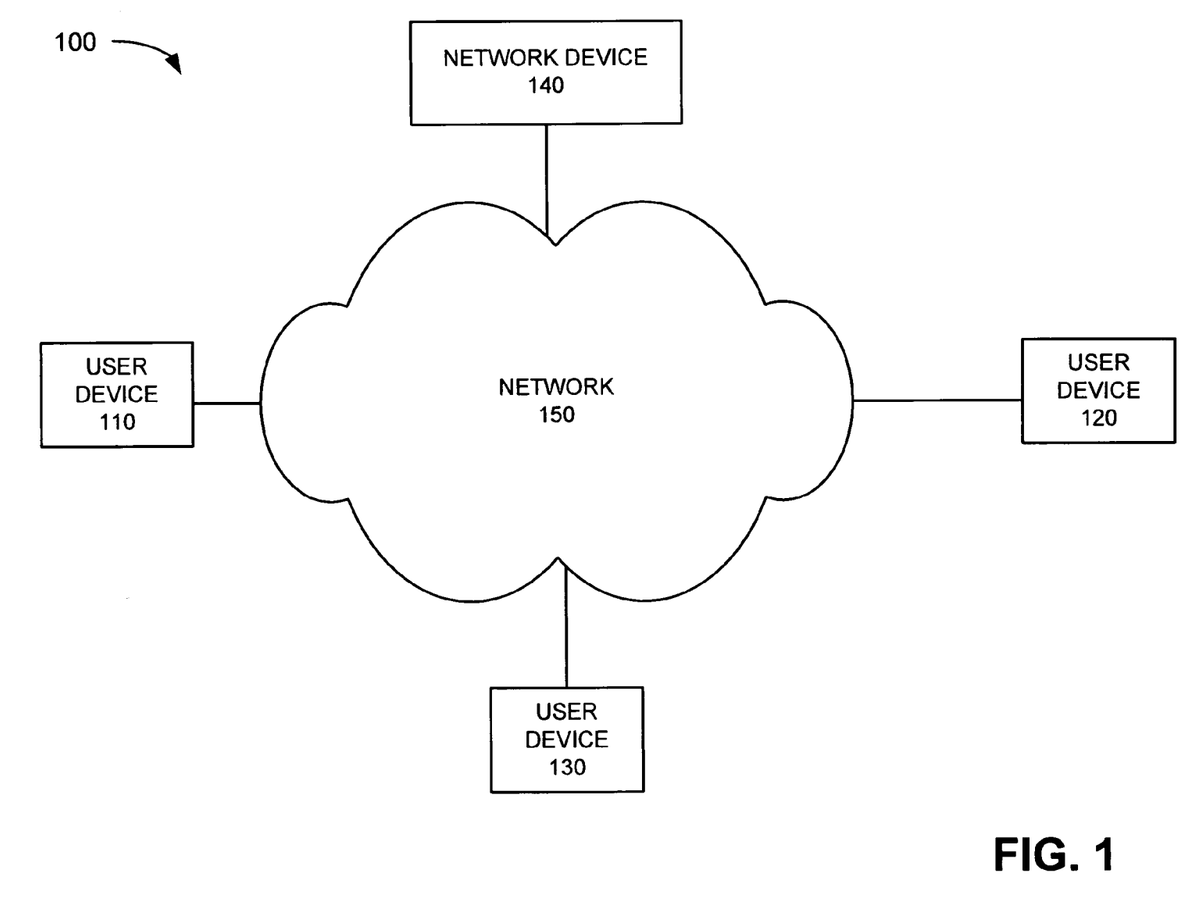
FIG. 1 illustrates an exemplary network in which systems and methods described herein may be implemented.

FIG. 1 is a block diagram of an exemplary network 100 in which systems and methods described herein may be implemented. Network 100 may include user devices 110, 120 and 130, network device 140 and network 150.

Each of user devices 110-130 may include any device or combination of devices capable of transmitting voice signals and/or data to a network, such as network 150. In one implementation, user devices 110-130 may include any type of communication device, such as a plain old telephone system (POTS) telephone, a voice over Internet protocol (VoIP) telephone (e.g., a session initiation protocol (SIP) telephone), a wireless or cellular telephone device (e.g., a personal communications system (PCS) terminal that may combine a cellular radiotelephone with data processing and data communications capabilities, a personal digital assistant (PDA) that can include a radiotelephone, or the like), etc. In another implementation, user devices 110-130 may include any type of computer device or system, such as a personal computer (PC), a laptop, a PDA, a wireless or cellular telephone that can communicate via telephone calls, teleconferences (e.g., video teleconferences) and/or text-based messaging (e.g., text messages, instant messaging, email, etc.). User devices 110-130 may connect to network 150 via any conventional technique, such as wired, wireless, or optical connections.

Network device 140 may include one or more computing devices, such as one or more servers, computers, etc., used to receive information from other devices in network 100. For example, network device 140 may identify information from a conversation between various parties associated with user devices 110-130, as described in detail below.

Network 150 may include one or more wired and/or wireless networks that are capable of receiving and transmitting data, voice and/or video signals, including multimedia signals that include voice, data and video information. For example, network 150 may include one or more public switched telephone networks (PSTNs) or other type of switched network. Network 150 may also include one or more wireless networks and may include a number of transmission towers for receiving wireless signals and forwarding the wireless signals toward the intended destinations. Network 150 may further include one or more packet switched networks, such as an Internet protocol (IP) based network, a local area network (LAN), a wide area network (WAN), a personal area network (PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100 may include additional elements, such as switches, gateways, routers, etc., that aid in routing traffic, such as telephone calls, from user devices 110-130 to their respective destinations in network 100. In addition, although user devices 110-130 and network device 140 are shown as separate devices in FIG. 1, in other implementations, the functions performed by two or more of user devices 110-130 and network device 140 may be performed by a single device or platform. For example, in some implementations, the functions described as being performed by one of user devices 110-130 and network device 140 may be performed by one of user devices 110-130.

Figure 2:
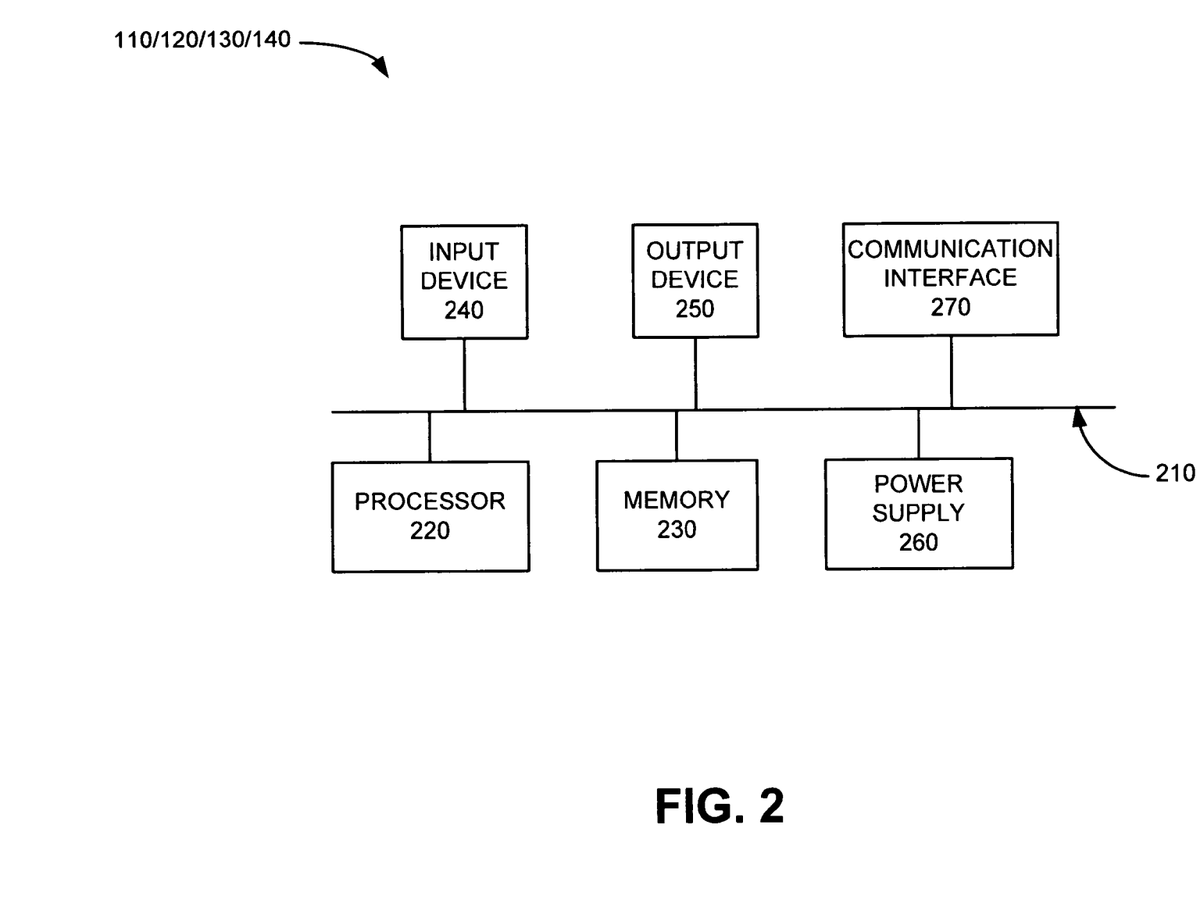
FIG. 2 illustrates an exemplary configuration of a user device or network device of FIG. 1.

FIG. 2 illustrates an exemplary configuration of user device 110. User devices 120 and 130 and network device 140 may be configured in a similar manner. Referring to FIG. 1, user device 110 may include a bus 210, a processor 220, a memory 230, an input device 240, an output device 250, a power supply 260 and a communication interface 270. Bus 210 may include a path that permits communication among the elements of user device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium and its corresponding drive.

Input device 240 may include a mechanism that permits a user to input information to user device 110, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc. Power supply 260 may include a battery or other power source used to power user device 110.

Communication interface 270 may include any transceiver-like mechanism that user device 110 may use to communicate with other devices (e.g., user devices 120/130 or network device 140) and/or systems. For example, communication interface 270 may include mechanisms for communicating via network 150, which may include a wireless network. In these implementations, communication interface 270 may include one or more radio frequency (RF) transmitters, receivers and/or transceivers and one or more antennas for transmitting and receiving RF data via network 150. Communication interface 270 may also include a modem or an Ethernet interface to a LAN. Alternatively, communication interface 270 may include other mechanisms for communicating via a network, such as network 150.

User device 110 may perform processing associated with conducting communication sessions. For example, user device 110 may perform processing associated with making and receiving telephone calls, sending and receiving electronic mail (email) messages, text messages, instant messages (IMs), mobile IMs (MIMs), short message service (SMS) messages, conducting teleconferences, retrieving voicemail messages, interacting with IVR systems, etc. User device 110, as described in detail below, may also perform processing associated with monitoring communications and identifying relevant content associated with the communications/conversation. User device 110 may perform these operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 270. Alternatively, hard-wired circuitry may be used in place of or in combination with software instructions to implement processes consistent with the implementations described herein. Thus, implementations described herein are not limited to any specific combination of hardware circuitry and software.

Figure 3:
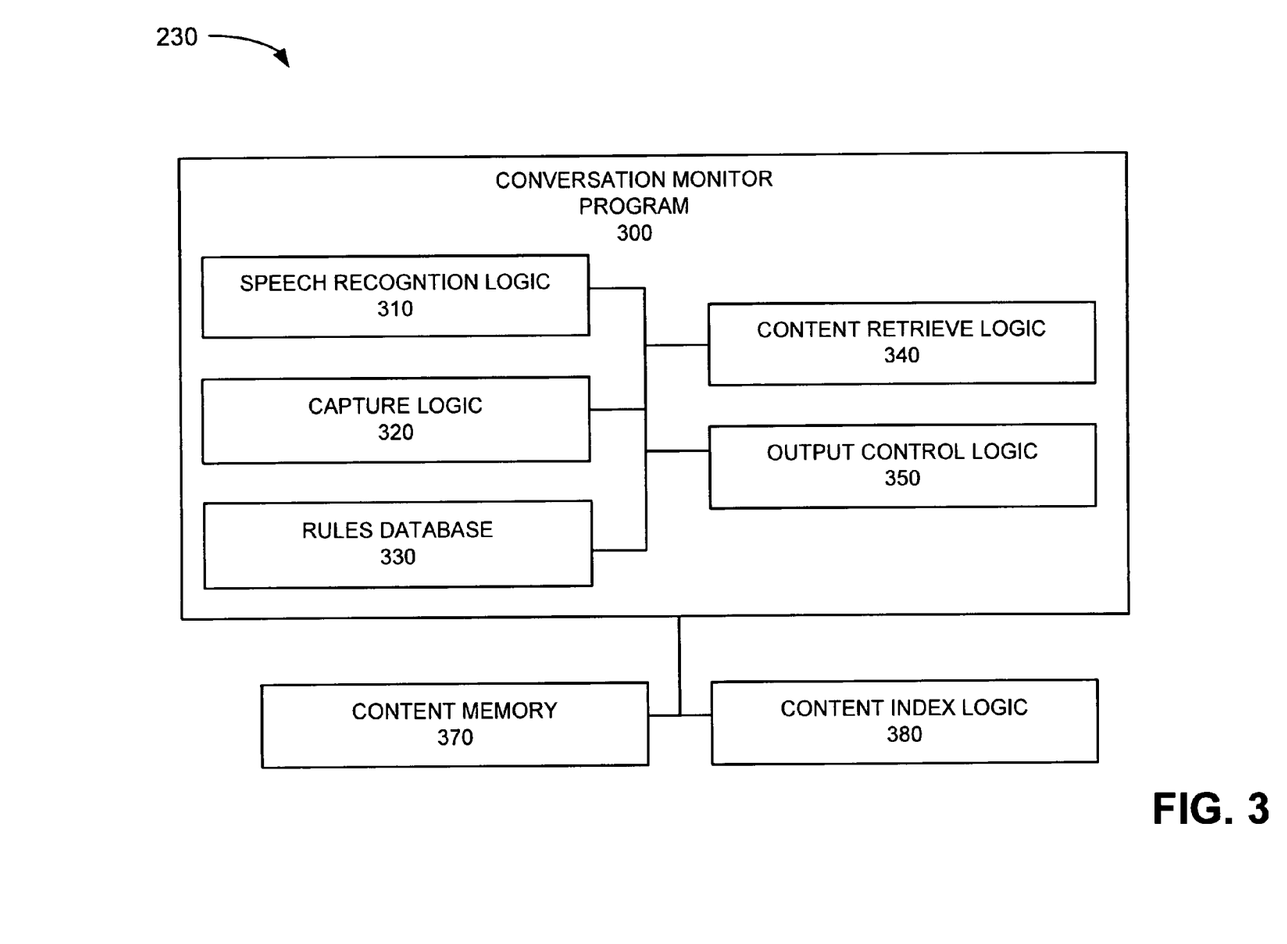
FIG. 3 illustrates an exemplary configuration of logic components implemented in the device of FIG. 2.

FIG. 3 is an exemplary functional block diagram of components implemented in user device 110 of FIG. 2. In an exemplary implementation, all or some of the components illustrated in FIG. 3 may be stored in memory 230. For example, referring to FIG. 3, memory 230 may include conversation monitor program 300, content memory 370 and content index logic 380. In addition, various logic components illustrated in FIG. 3 may be implemented by processor 220 executing one or more programs stored in memory 230.

Conversation monitor program 300 may include a software program executed by processor 220 that monitors conversations or communications, such as phone calls, text-based communication sessions, voicemail messages, video teleconferences, etc., involving the user of user device 110. In an exemplary implementation, conversation monitor program 300 may include speech recognition logic 310, capture logic 320, rules database 330, content retrieve logic 340 and output control logic 350. Conversation monitor program 300 and its various logic components are shown in FIG. 3 as being included in user device 110. In alternative implementations, these components or a portion of these components may be located externally with respect to user device 110. For example, in some implementations, one or more of the components of conversation monitor program 300 may be located in or executed by network device 140.

Speech recognition logic 310 may include logic to perform speech recognition on voice data provided by one or more parties or automated systems during a conversation. For example, speech recognition logic 310 may convert voice data from parties involved in a telephone conversation or video teleconference, such as parties at user devices 110 and 120, into text corresponding to the voice data. Capture logic 320 may then extract information from the conversation, as described below.

Capture logic 320 may interact with other logic components of conversation monitor program 300 to identify certain portions of a conversation between parties. For example, capture logic 320 may interact with rules database 330 to identify words and/or phrases that most likely correspond to relevant information, such as events, topics, locations, people, places, dates/times, etc. As one example, rules database 330 may include rules that indicate that capture logic 320 is to extract certain event-related words. For example, terms/phrases, such as "vacation," "meeting," "concert," "basketball game," "party," etc., that refer to an event may be extracted from a conversation.

Capture logic 320 may also capture topic-related information associated with a conversation. For example, rules database 330 may indicate that terms/phrases frequently spoken during a communication session often refer to a general topic of the conversation. For example, if parties in a conversation refer to a term more than a predetermined number of times (e.g., two or more), this term may correspond to a topic of the conversation. As an example, suppose that parties at user devices 110 and 120 are conducting a conversation and refer to a "server upgrade" several times. In this case, capture logic 320 may extract the term "server upgrade" from the conversation. As another example, suppose that the parties use the term "birthday party" a number of times during the conversation. In this case, capture logic 320 may capture the term "birthday party."

Rules database 330 may also include a database or may be associated with one or more databases that includes names of cities, states, countries, names of places, such as retail establishments (e.g., restaurants, shopping malls, stores, etc.), schools, parks, etc. In such instances, capture logic 320 may compare the names uttered or text that is input during a conversation to the names in rules database 330 and capture terms or phrases that correspond to locations or places.

Rules database 330 may also includes rules that identify various names, such as names of people, terms that indicate a relationship, such as "Mom," "brother," "son," etc. In such implementations, capture logic 320 may capture these names and/or relationship-related terms.

Rules database 330 may also store rules that indicate that numbers and words which immediately follow the numbers, often correspond to an address. For example, the phrase "one two three Main," includes numbers (i.e., 123), followed by one word (i.e., Main). In this case, capture logic 320 may identify the phrase "one two three main" as corresponding to an address of 123 Main. Rules database 330 may also store rules that indicate that one or more words that precede any of the words "street," "avenue," "boulevard," etc., typically correspond to addresses. In this case, capture logic 320 may capture these terms along with one or more words that precede these terms.

Capture logic 320 may also capture or extract other information from a conversation. For example, rules database 330 may include rules indicating that capture logic 320 is to capture information, such as telephone numbers, IP addresses and other contact-related information for parties in a conversation. In this case, rules database 330 may indicate that seven or more digits spoken consecutively or input as a text string correspond to a telephone number. In some instances, rules database 330 may indicate that 10 or more digits spoken consecutively with the number one preceding the 10 digit number correspond to a long distance telephone number, and that a string of numbers following the numbers 011 may represent a foreign telephone number. Rules database 330 may further indicate that phrases ending in "dot com" refer to an IP address. Similarly, a first input string or sequence of letters/numbers followed by a second input string or sequence of letters/numbers separated by the term "at" or the symbol "@" may be identified as an email address. In such instances, capture logic 320 may capture the telephone number, IP address and/or email address.

Rules database 330 may further include rules designed to capture terms that are frequently used to elicit information from a user. For example, rules database 330 may include rules that indicate that one or more words in a phrase that ends with the word "number" are to be captured. In this case, capture logic 320 may capture terms/phrases such as "account number," "serial number," "social security number," "telephone number," etc. Rules database 330 may also include rules that indicate that one or more words that end with the word "password," "identifier," "ID," are to be captured by capture logic 320. In this case, capture logic 320 may capture terms/phrases such as "account password," "service identifier," "account identifier," "login ID," etc. In each case, capture logic 320 may capture the desired information based on various rules and/or databases stored in, for example, rules database 330.

In some implementations, rules database 330 may be designed to capture terms/phrases associated with various inquires. For example, rules database 330 may include rules designed to capture, address-related inquiries, contact-related inquiries, mathematical-related inquiries, etc., as described in detail below.

Content retrieve logic 340 may include logic that uses the information (e.g., words or phrases) identified by capture logic 320 to retrieve information from content memory 370. For example, content retrieve logic 340 may use a term/phrase identified by capture logic 320 and search content memory 370 to identify content that may be relevant to the conversation or communication, as described in detail below.

Content memory 370 may include one or more memories, such as a HDD, SSD, RAM, ROM or another memory that stores content and/or metadata or tag data associated with content that is stored on user device 110. For example, in one implementation, content memory 370 may include text files, audio/music files, image/video files, multi-media files, etc. In some implementations, all or a portion of the files stored in content memory 370 may include metadata, tag data, file name information or other information associated with the content and/or information associated with identifying the content. The metadata, tag data and/or name data may facilitate retrieval of the content at a later time, as described in detail below.

Content index logic 380 may include logic that indexes the content stored in content memory 370 based on one or more parameters associated with the content. Content index logic 380 may index the content in content memory 370 on a continual basis as content is stored on user device 110 or on a periodic basis. In one implementation, content index logic 380 may include software instructions executed by processor 220 that indexes the information stored in content memory 370 and populates entries of a database based on the content and/or metadata, tag data or other information associated with the content stored on user device 110.

Figure 4:
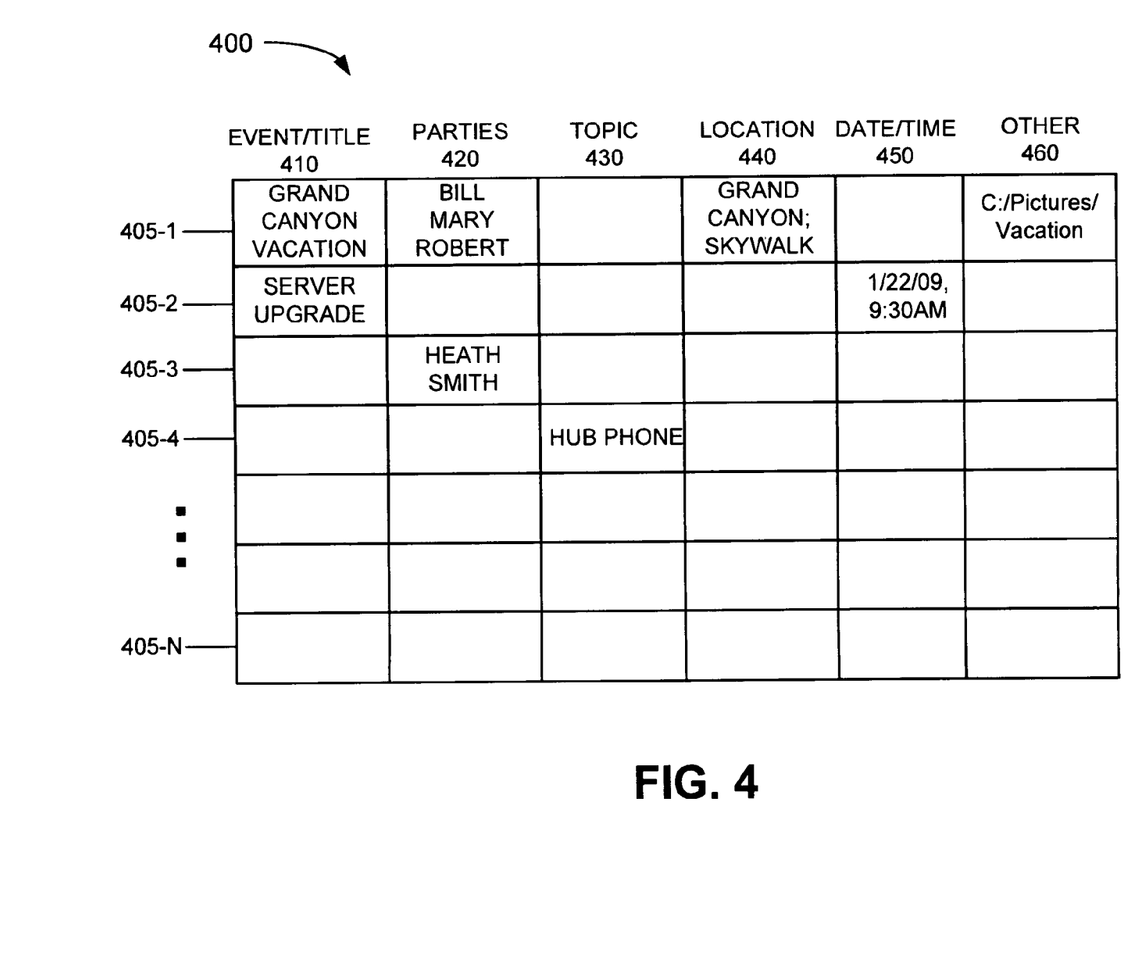
FIG. 4 illustrates an exemplary structure of a database stored in one of the devices of FIG. 1.

For example, FIG. 4 illustrates an exemplary database 400 populated by content index logic 380. Database 400 may be stored in memory 230 and may include entries 405-1 through 405-N (referred to herein as entries 405). Each entry 405 may be associated with some type of content included in content memory 370, such as a text file, an audio/music file, an image/video file, a multi-media file, etc. Database 400 may include event/title field 410, parties field 420, topic field 430, location field 440, date/time field 450 and other field 460.

As described above, metadata may be included with various files in content memory 370. The metadata may include, for example, title information, location information, date/time information, etc. As an example, metadata for a music file stored in content memory 370 may include the name of a song. Content index logic 380 may extract the metadata from files stored in content memory 370 and store the appropriate information in fields 410-460 of various entries 405 in database 400, along with a link or a location of the actual content associated with the metadata. The link or location information facilitates retrieval of the content at a later time.

In other instances, a user associated with user device 110 may add tag information to various files, such as image files, text files, music files, etc. As an example, a user may add tag data, such as "Grand Canyon vacation" to image or video files stored in content memory 370. In this case, content index logic 380 may identify the tag information and store the appropriate tag information in fields 410-460 of various entries 405 of database 400, along with a link or information identifying the actual content/file and/or its location in content memory 370.

In still other instances, various files may include title or name information identifying the file. As an example, a text file may include a name or title of the file (e.g., "Server upgrade presentation"). In this case, content index logic 380 may identify the title information and store the appropriate information in fields 410-460 of various entries 405 of database 400.

Referring back to FIG. 4, event/title field 410 may store information identifying an event or title associated with a file. As one example, a picture or image file may include a tag or name of "Grand Canyon vacation." Content index logic 380 may store the tag/name "Grand Canyon vacation" in field 410 of entry 405-1, as illustrated in FIG. 4. As another example, a file may include the title "Server upgrade presentation." Content index logic 380 may store the title "Server upgrade presentation" or "Server upgrade" in event/title field 410 of entry 405-2, as illustrated in FIG. 4, along with a link or information identifying the actual content/file and/or its location in content memory 370.

Parties field 420 may store information identifying one or more parties associated with a file. For example, a data file forwarded to the user of user device 110 from Heath Smith and stored in content memory 370 may include the name "Heath Smith" in a metadata field of the file. Content index logic 380 may store this information in parties field 420 of entry 405-3, as illustrated in FIG. 4. As another example, the Grand Canyon vacation pictures discussed above may include tag information added by the user after the pictures were taken that identifies the people in the particular pictures. Content index logic 380 may access the tag information and store the names of the people (e.g., Bill, Mary, Robert) in parties field 420 of entry 405-1, which also stores the title "Grand Canyon vacation" in field 410.

Topic field 430 may store information associated with a topic of various content in content memory 370. For example, a text file may include several occurrences of the same term. In this case, content index logic 380 may scan the file and store a term/phrase that appears at least a predetermined number of times (e.g., two or more times) in the file in topic field 430 of an entry 405 in database 400. As an example, a data file stored in content memory 370 that is associated with a new project that the user of user device 110 is working on may include the phrase "Hub phone" several times. In this case, content index logic 380 may identify and store the term "Hub phone" in topic field 430 of entry 405-4, as illustrated in FIG. 4.

Location field 440 may store information associated with a location of a particular file. For example, a geotag included with a picture may identify a location at which a picture was taken. Content index logic 380 may access the geotag and store the location information from the geotag in location field 440 of an entry 405 in database 400. As an example, the file including the Grand Canyon vacation pictures may include a location of "Grand Canyon" and "Skywalk." Content index logic 380 may store these locations in location field 440 of entry 405-1, as illustrated in FIG. 4.

Date/time field 450 may include information associated with a date and time at which a file was received, a date and/or time associated with when an image file (e.g., a picture) was taken, a date and/or time associated with when a file was updated, etc. For example, a particular text file, such as the file associated with the server upgrade, may include the time that the file was last updated. Content index logic 380 may store this date and time information in date/time field 450 of entry 405-2, as illustrated in FIG. 4.

Other field 460 may include other information associated with files stored in content memory 370. For example, other field 460 may include a link or information identifying the location of the actual content corresponding to each entry 405 in database 400. As an example, other field 460 for entry 405-1 may include the location of the Grand Canyon vacation pictures stored in content memory 370 of user device 110. That is, in this example, the Grand Canyon vacation pictures may be stored in the C drive of user device 110 under a folder named "pictures" and in a subfolder named "vacation." Other field 460 may also include any other information that may aid in retrieving potentially relevant content from content memory 370. For example, other field 460 may include any context-related information associated with files or other information, stored in content memory 370, that may aid in retrieving the content at a later time.

As described above, capture logic 320 may extract information from a communication session between parties at user devices 110 and 120. Content retrieve logic 340 may then compare the captured information to information stored in database 400 to identify relevant content.

Referring back to FIG. 3, output control logic 350 may include logic that outputs information retrieved by content retrieve logic 340 from content memory 370 to a user of user device 110 via output device 250, such as a display (e.g., an LCD display). Output control logic 350 may also facilitate forwarding the retrieved information to other devices, such as user device 120. For example, output control logic 350 may allow the user to confirm whether various content displayed to the user should be forwarded to other parties via, for example, network 150.

Conversation monitor program 300, as described above, may retrieve information from content memory 370 during conversations or other communications. Conversation monitor program 300 may also provide the retrieved information to the user to allow the user to forward the retrieved information to other parties in a real-time or near real-time manner, as described in detail below.

Figure 5:
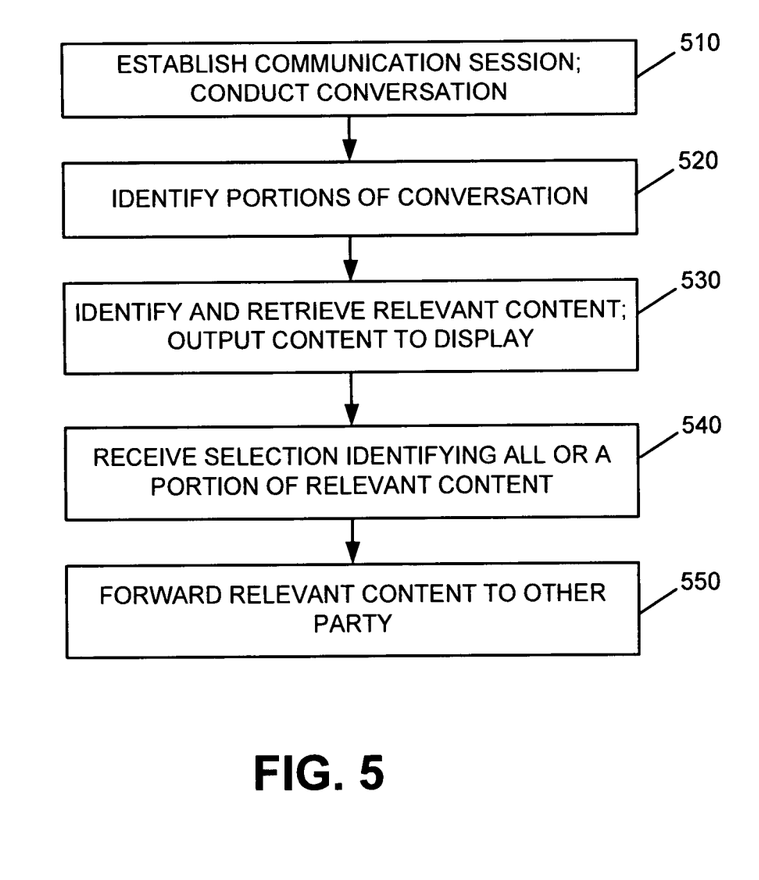
FIG. 5 is a flow diagram illustrating exemplary processing by various devices illustrated in FIG. 1.

FIG. 5 is a flow diagram illustrating exemplary processing associated with identifying portions of a conversation between parties in network 100 and retrieving relevant content based on the identified portions. Processing may begin with a user of user device 110 initiating communications with another party, such as placing a phone call or sending a text-based message, or receiving a communication from another party. For example, assume that a party at user device 110 places a telephone call to a party at user device 120 and establishes a voice-based communication session with the party at user device 120. Further assume that an ensuing conversation takes place (act 510).

As the parties at user devices 110 and 120 are talking to each other, conversation monitor program 300 may identify portions of the conversation (act 520). For example, speech recognition logic 310 may convert speech from the parties at user devices 110 and 120 into corresponding text. Capture logic 320 may then identify portions of the text using rules stored in rules database 330 (act 520).

For example, as discussed above with respect to FIG. 3, capture logic 320 may identify words and/or phrases that most likely correspond to an event that the parties are discussing. As one example, assume that Joe, a party at user device 110, says to Bill, a party at user device 120, the following: "We really enjoyed visiting the Grand Canyon. We went on the Skywalk and had an amazing view of the entire Grand Canyon."

In this case, speech recognition logic 310 may convert the voice input by Joe and Bill into text and forward the text to capture logic 320. Capture logic 320 may identify the term "Grand Canyon" as corresponding to a keyword/term, such as a topic, event or location associated with the conversation. For example, since the term "Grand Canyon" was mentioned more than one time, capture logic 320 may identify the term as corresponding to a topic of the conversation. Capture logic 320 may also access a database stored in rules database 330 that includes locations, and identify the term "Grand Canyon" as corresponding to a location. Other terms in the conversation may also be identified as being relevant or as corresponding to information that meets or satisfies one or more rules stored in rules database 330. For example, the term "Skywalk" may be identified as corresponding to a location.

Content retrieve logic 340 may access database 400 and/or content memory 370 to identify content that may be relevant to the conversation (act 530). For example, continuing with the example above, content retrieve logic 340 may access database 400 and search for information that matches the term "Grand Canyon" or "Skywalk." In this case, assume that Joe, the user of user device 110, has stored pictures of his vacation to the Grand Canyon and that the pictures were tagged with the name "Grand Canyon vacation." Further assume that the name "Grand Canyon vacation" was indexed by content index logic 380 and stored in field 410 of entry 405-1 in database 400, as illustrated in FIG. 4. Further assume that the location of the actual pictures within user device 110 is stored in other field 460 of entry 405-1, as illustrated in FIG. 4.

Content retrieve logic 340 may then retrieve the Grand Canyon vacation pictures stored in content memory 370 (act 530). That is, content retrieve logic 340 may utilize the location information in other field 460 (or a link included in field 460) to retrieve the actual vacation pictures/files. Output control logic 350 may then output the retrieved pictures to the user of user device 110 via output device 250, such as a display (act 530). The user of user device 110 (i.e., Joe in this example) may then determine that he would like to forward these pictures to the party at user device 120 (act 540).

For example, in one implementation, the user of user device 110 may select a "select all" or "forward all" button indicating that all of the pictures that have been retrieved are to be forwarded to user device 120. In other instances, the user may select individual pictures to be forwarded. In either case, output control logic 350 may forward the selected pictures/photos to user device 120 via network 150 (act 550). In still other instances, output control logic 350 may automatically forward the retrieved pictures to user device 120, without the user of user device 110 having to select any of the pictures and/or without the user of user device 110 having to manually generate a message (e.g., a text message, IM or email message) to the party at user device 120. In each case, the retrieved content may be forwarded to the other party in the conversation while the conversation is taking place. This allows both parties to more fully understand what is being discussed in the conversation.

As described above, conversation monitor program 300 may identify portions of an audio-based conversation, such as a telephone call, retrieve context-related content and provide the content to other parties "on the fly" or in real-time during the conversation. In other instances, conversation monitor program 300 may identify portions of a text-based conversation, such as an IM-based communication session, and provide context-related content to parties in a similar manner while the conversation is occurring.

Conversation monitor program 300 may also retrieve and/or forward other types of context-related information. For example, assume that the users of user device 110 and user device 120 are discussing a new song released by a particular artist. Capture logic 320 may identify the title of the song or the artist being discussed by the parties at user devices 110 and 120 and content retrieve logic 340 may search database 400 for information matching the captured song title and/or name of the artist. Assume that content retrieve logic 340 identifies information stored in database 400 that matches the song title and/or artist's name and retrieves the audio file from content memory 370. Output control logic 350 may then automatically play the audio file to the user of user device 120 or display a link to the song so that the user may select the song and play the song. In other instances, output control logic 350 may forward the retrieved audio file for the song to user device 120.

In some implementations, when the song being discussed is not stored in content memory 370, output control logic 350 may automatically output a link to an online music store from which the user may purchase and download the song that is being discussed. That is, output control logic 350 may perform an online search for a music store that sells music for downloading and may automatically display a link to the online music store on output device 250 of user device 110. In this manner, conversation monitor program 300 may automatically perform as needed functions (i.e., a search function in this example) when the information of interest is not readily available on user device 110.

Conversation monitor program 300, as described above, may access local information stored on user device 110 to enhance a conversation. In some implementations, conversation monitor program 300 may also access or leverage information accessible within a network to perform various functions. For example, suppose that parties at user devices 110 and 120 are discussing a particular television program. Speech recognition logic 310 may perform speech recognition for the conversation and capture logic 320 may identify the name of the television program being discussed using rules stored in rules database 330. Content retrieve logic 340 may receive the name of the television program being discussed from capture logic 320. Content retrieve logic 340 may then access a locally stored television guide or remotely access a television guide via network 150 to identify when the program is to be broadcast. Output control logic 350 may output a message to the user of user device 110 indicating when the program is to be broadcast and may also inquire as to whether the user would like to record the television program on, for example, a digital video recorder. If the user responds with an affirmative indication, output control logic 350 may signal, via network 150, the digital video recorder or a set top box associated with the digital video recorder to record the program.

As still another example, a user at user device 110 may be conducting a telephone conversation with a co-worker at user device 120. The user at user device 110 may mention the name of another co-worker. In this case, speech recognition logic 310 may perform speech recognition and capture logic 320 may capture the name of the co-worker. Content retrieve logic 340 may access a contacts list/address book stored on user device 110 to attempt to retrieve the telephone number and/or other contact information associated with the co-worker mentioned during the conversation. Alternatively, or if the co-worker's contact information is not found locally on user device 110, content retrieve logic 340 may access, via network 150, a company database that lists employees names and contact information (e.g., telephone numbers, addresses, etc.) to attempt to retrieve the telephone number or other contact information associated with the co-worker mentioned during the conversation. In each case, if content retrieve logic 340 identifies the appropriate contact information, output control logic 350 may output a message to the user of user device 110 via output device 250 that displays the co-worker's contact information. In a similar manner, if a telephone number, email address or other identifier is mentioned during a conversation, content retrieve logic 340 may attempt to identify additional contact information (e.g., name, work location, etc.) and provide that information to the user of user device 110 while the conversation is taking place.

In some implementations, output control logic 350 may also inquire as to whether the user at user device 110 would like to establish a communications link when a phone number or name of a party is mentioned. For example, as discussed above, if a name of a co-worker is mentioned during a conversation and content retrieve logic 340 has identified a telephone number associated with the name, output control logic 350 may inquire whether the user at user device 110 would like to establish a telephone link with the identified co-worker. If the user responds with an affirmative indication, output control logic 350 may automatically initiate the establishment of the telephone call to the other party (e.g., dial the telephone number). In a similar manner, if a telephone number is identified during a conversation, output control logic 350 may inquire whether the user at user device 110 would like to establish a telephone link to the identified telephone number. If so, output control logic 350 may initiate the call (e.g., dial the telephone number). In each case, conversation monitor program 300 may access locally stored information or access information available via a network, such as network 150, to provide information to a user and/or initiate additional communications.

In still other implementations, a name and/or telephone number captured during a conversation by capture logic 320 may be added to a contacts list/address book application stored on user device 110. In such implementations, conversation monitor program 300 may access a locally stored contacts list/address book and determine whether the name and/or telephone number is listed in the contacts list/address book. If the name and/or telephone number is not listed, output control logic 350 may stored the name and/or telephone number in the contacts list/address book and may also prompt the user to provide additional information for entering into the contacts list/address book. Alternatively, an address or telephone number captured during a communication session may be mapped or cross-referenced to a person or business. In this case, output control logic 350 may add the address and/or telephone number information to an existing contact in the contacts list/address book or create a new entry in the contacts list/address book. In still other instances, a captured address may correspond to a meeting location. In this case, output control logic 350 may forward the captured address to a calendar/meeting application stored on user device 110. The calendar/meeting application may then prompt the user to determine whether the address is to be stored in a particular entry associated with a future meeting.

As discussed above, capture logic 320 may capture various types of information during communication sessions and provide additional information that may be useful during the communication session. In still other instances, capture logic 320 may capture various types of inquiries from one or more users during a communications session. For example, suppose that the user at user device 120 is discussing a simple math calculation with the user of user device 110. As some simple examples, suppose the user at user device 120 says, "What's 15% of 175 dollars?," "What's 13 times 17?," or provides some other mathematical equation. Capture logic 320 may use rules stored in rules database 330 and determine that a mathematical-based question or equation has been voiced. Content retrieve logic 340 may access a calculator program stored on user device 110 and perform the identified calculation. Output control logic 350 may then output the answer to the calculation on output device 250. In this manner, the user at user device 110 may quickly provide the answer to the user at user device 120 without having to manually perform the calculation.

As another example, suppose that the user at user device 120 asks the user at user device 110, "What is Mary's telephone number?" In this case, capture logic 320 may use rules stored in rules database 330 and determine that an inquiry requesting the telephone number of Mary has been voiced. Content retrieve logic 340 may automatically access a contacts list/address book stored on user device 110 and identify Mary's telephone number. Alternatively, content retrieve logic 340 may access a database (e.g., a company database) via network 150 to identify Mary's telephone number. In either case, if Mary's telephone number is identified, output control logic 350 may output Mary's telephone number for display on output device 250. In this manner, the user at user device 110 may quickly provide the answer to the user at user device 120 without having to manually look up Mary's contact information.

As described above, conversation monitor program 300 may interact with one or more parties during a communication session and share context-related content with a party with whom a conversation is being conducted. In another exemplary implementation, assume that user devices 110 and 120 each include video teleconferencing equipment. During a typical video teleconference involving two sites, one or more cameras at each site may provide a live video feed to the other site so that parties at each site can view each other and what is occurring at the other site. Typically, a camera at each site is focused on a white board and/or the teleconference participant(s) so that the parties at each site can communicate via text and audio, as well as see each other and display various items over the video teleconference link.

Assume that the party at user device 110 is involved in a video teleconference with one or more parties at user device 120. Further assume that the parties at user devices 110 and 120 mention a particular document or presentation associated with a project that the parties are working on together and that the document/presentation is mentioned multiple times. Capture logic 320 at user device 110 may capture the name of the project or document mentioned by the parties, and content retrieve logic 340 may search database 400 and/or content memory 370 for a file matching the captured name. Assume that the captured name is "Hub phone," and that entry 405-4 in database 400 includes the term "Hub phone" in topic field 430, as illustrated in FIG. 4. In this case, content retrieve logic 340 may retrieve the appropriate file from content memory 370. Output control logic 350 may then display the file on output device 250 of user device 110. Output control logic 350 may also forward the file to user device 120 via the video teleconference link. In one instance, the party at user device 120 may also view the file displayed on output device 250 of user device 110 via the teleconference link.

For example, the document displayed at user device 110 may be displayed to the parties in the teleconference at user device 120 via a split screen type window, where one portion of the split screen displays the file that the parties are discussing and the other portion of the split screen displays the party at user device 110 with whom the teleconference is being conducted. In this manner, information may be displayed or forwarded via a video teleconferencing window to enhance or augment the conventional video teleconference. Other types of information, such as contact information, follow-up action items, etc., may also be passed between the parties in this manner.

In still other implementations, conversation monitor program 300 may interact with automated systems, such as voice mail systems, IVR systems, etc. For example, assume that user device 110 includes a voicemail system and that the party associated with user device 110 accesses the voicemail system and plays back a voicemail, such as a video voicemail, left by a party associated with user device 120. As the voicemail is playing, capture logic 320 may identify keywords/terms that may be relevant to the voicemail.

For example, capture logic 320 may identify a topic of the voicemail, such as one in which the caller has left a message requesting information that is not available to the caller. As an example, the caller at user device 120 may have left a message, such as "Hi Joe, this is Bill. I'm working on the server upgrade now. I was wondering if you have the slide presentation for the server upgrade?" In this example, capture logic 320 may identify the phrase "server upgrade" as corresponding to a topic of the voicemail since the phrase was uttered more than one time. Content retrieve logic 340 may access database 400 and search for this phrase. Assume that the phrase "server upgrade" is stored in event/title field 410 of entry 405-2, as illustrated in FIG. 4. Content retrieve logic 340 may then retrieve the identified content from content memory 370. That is, content retrieve logic 340 may use the location information or link information stored in other field 460 that identifies the location of the actual file stored in user device 110 and retrieve the slide presentation file for the server upgrade.

Output control logic 350 may then allow the user of user device 110 to forward the retrieved file to user device 120. For example, output control logic 350 may display a message such as "Would you like to send this file to Bill?" The user at user device 110 may select yes and output control logic 350 may automatically forward the desired file to user device 120. In this manner, the user of user device 110 may forward the retrieved file to user device 120, without requiring the user at user device 110 to call back the party at user device 120 (i.e., Bill in this example).

In some implementations, prior to the voicemail being played by the user of user device 110, content retrieve logic 340 may have already reviewed the voicemail and identified or tagged certain keywords that may require action. For example, in this instance, the term "server upgrade" may be tagged and visually highlighted for the user (e.g., via output device 250, such as an LCD display) when the user replays the voicemail (e.g., video voicemail). For example, the term "server upgrade" may be displayed on the display device with a hyperlink that, when selected, automatically retrieves the related document or allows the user to select the document for sending to the caller who left the voicemail message.

In addition, in some implementation, user device 110 may send an alert message to the user of user device 110 when a voicemail is received. In such implementations, the keywords/terms identified by capture logic 320 may be provided to the user, along with the alert. This may allow the user to quickly identify information that is being requested by another party.

Still further, in some implementations, words or phrases in a voicemail that are identified by content retrieve logic 340 may be highlighted for the user for other types of action. For example, a telephone number identified by content retrieve logic 340 may be highlighted along with a message stating "Would you like to save this telephone number in your address book?" The user may select yes and output control logic 350 may automatically save the telephone number in an address book on user device 110.

As still another example, in some implementations, words or phrases in a voicemail that are identified by content retrieve logic 340 may be used to trigger a search, provide a link and/or perform other functions based on the particular identified word(s) and/or phrase(s). For example, assume that a caller at user device 120 left a voicemail message for his friend at user device 110 asking for the address of a particular restaurant where they are supposed to meet for dinner, such as "What is the address of Tony's Pizza?" In this case, content retrieve logic 340 may identify the word "address" and the location "Tony's Pizza." If content memory 370 does not include information matching one or more of these terms, content retrieve logic 340 may automatically perform an Internet search or a local search of user device 110 for the address of Tony's Pizza. The address information may then be highlighted for the party at user device 110 prior to playing the voicemail message. In this manner, conversation monitor program 300 may perform various functions based on the context of a communication received by user device 110.

Conversation monitor program 300, as discussed briefly above, may also interact with other automated systems, such as IVR systems. For example, in one implementation, assume that the user of user device 110 is interacting with an IVR system that requests various types of information from the user (e.g., a serial number of a product, customer service identifier, customer account number, etc.). As an example, assume that the user at user device 110 has called an IVR system associated with a computer vendor's service support division. Further assume that the IVR system has provided the following automated message to the user of user device 110: "Please provide the customer service account number for your computer." In this case, capture logic 320 may capture the term "customer service account number." Content retrieve logic 340 may use this term to search content database 400 and/or content memory 370. Assume that content retrieve logic 340 finds a match in an entry 405 in database 400 and retrieves a service agreement document that includes the requested customer service account number. Output control logic 350 may display the customer service account number on output device 250 of user device 110. In this manner, the user of user device 110 may quickly provide the account number to the IVR system.

In another implementation, user device 110 may display the customer service account number and transmit the account number to the IVR system, as opposed to the user verbally providing or inputting the account number via a keypad. This may help eliminate problems associated with a speech recognition system at the IVR system (e.g., errors identifying information that is verbally provided). In a similar manner, other information may be provided via a data link to the IVR system to avoid speech recognition errors. For example, output device 250 of user device 110 may be a display device, such as touch screen device. When interacting with an IVR system, output control logic 350 may display contextual items, such as a "Yes" box, "No" box, or other items associated with the context of the interaction with the IVR system. The user of user device 110 may then simply press the appropriate displayed item in response to the IVR system, and output control logic 350 may forward the corresponding response to the IVR system, as opposed to the user verbally providing a response or entering the response by pressing a combination of letters and numbers on a keypad.

In each case, conversation capture program 300 selectively identifies information from a conversation and automatically retrieves or provides information that may be relevant to a current conversation/communication. This may provide the user with an ability to easily retrieve context-related information when interacting with others and/or automated systems.

Conversation capture program 300 may also facilitate the recalling of information, such as names, telephone numbers, portions of conversations or other information that may have been exchanged during a conversation. For example, information associated with various communications sessions may be accessed by a user to recall information of interest after the communication session has taken place, as described in detail below.

Figure 6:
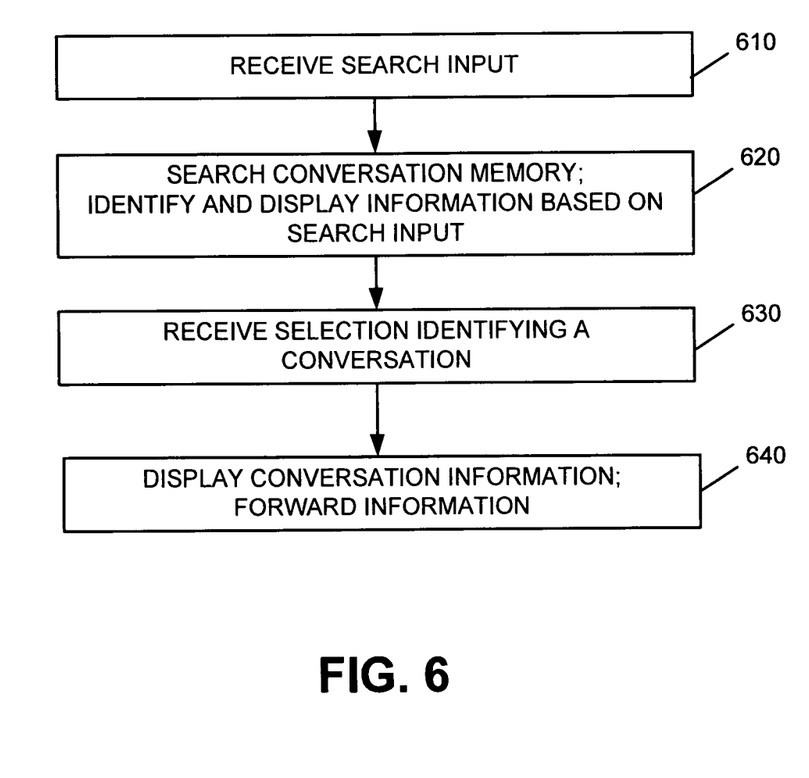
FIG. 6 is a flow diagram illustrating exemplary processing associated with retrieving stored information associated with a conversation or communication session.

FIG. 6 illustrates exemplary processing associated with recalling information captured during an earlier conversation. Processing may begin with a party at user device 110 accessing conversation monitor program 300. Conversation monitor program 300 may include a search option that allows the user to search through information associated with earlier conversations. For example, as described above, speech recognition logic 310 may convert audio input provided by parties involved in a conversation, teleconference, etc., into text. In some implementations, speech recognition logic 310 may store an entire transcript of the communication session/conversation in content memory 370. Alternatively, another memory may be used to store the transcripts of the communications sessions.

Assume that the user at user device 110 accesses the search option and inputs a search input. For example, assume that the user of user device 110 knows that he/she talked to a number of people during a teleconference on Jan. 7, 2009. Further assume that the user would like to recall information associated with what Susan, a party in the teleconference, discussed during the teleconference. In this example, the user may input the name Susan as a search input. Alternatively, the user may input the date of the teleconference (i.e., Jan. 7, 2009 in this example) or other information as a search input.

Content retrieve logic 340 may receive the search input (act 610). Content retrieve logic 340 may then search the conversation memory associated with conversation monitor program 300 to identify one or more entries that correspond to the search input (act 620). Content retrieve logic 340 may then identify one or more entries that correspond to the inputted search information (act 620). Output control logic 350 may then display information associated with one or more conversations that were identified based on the search input (act 620).

For example, if more than one conversation matches the search term, output control logic 350 may display a snippet or brief portion of each identified conversation that satisfies the search input (act 620). The snippet may include a name of a party associated with the conversation, the date/time of the conversation, etc.

Assume that the user selects the snippet or information associated with the teleconference of interest (act 630). Output control logic 350 may then provide a full transcript of the selected conversation (i.e., teleconference in this example) (act 640). Alternatively, output control logic 350 may output a modified version of the selected conversation. That is, output control logic 350 may display portions of the conversation involving the inputted search term. As an example, output control logic 350 may display portions of the transcript that were associated with the search term of interest (i.e., Susan in this example). In each case, output control logic 350 may provide information that allows the user of user device 110 to be able to quickly identify the information of interest. In this manner, conversation monitor program 300 may facilitate retrieval of information from earlier conversations at a later time. This may allow a user to recall information of interest, such as portions of conversations that include telephone numbers, email addresses, follow-up action items, etc.

In some instances, the user of user device 110 may forward information associated with the conversation to other parties (act 640). For example, the user of user device 110 may forward all or a portion of the transcript of the teleconference to a party at user device 120.

As described above, user device 110 may store and execute conversation monitor program 300 to identify and retrieve context-related information in real-time or near real-time as a conversation is occurring. This information may then be provided to another party with whom the conversation is being conducted, while the conversation is still occurring. This may allow for a fuller, interactive conversation to occur.

In some implementations, network device 140 may store and execute conversation monitor program 300, as opposed to a user device (e.g., user device 110). In such implementations, database 400 may be stored on network device 140 and network device 140 may search database 400 to identify relevant content. Network device 140 may then access content memory 370 on user device 110 or signal user device 110 to retrieve the relevant content and optionally, forward the relevant content to the other party involved in the conversation. In addition, in some implementations, network device 140 may store conversation-related information for parties involved in conversations.

For example, as discussed above, speech recognition logic 310 may generate and store transcripts of earlier conversations in a conversation memory. In such implementations, network device 140 may act as a server that stores transcripts of conversations for a large number of parties. In this case, a user at user device 110 may log onto the server 140 using a user name/password (or other suitable access control mechanism) to search and/or retrieve his/her conversation-related information.

Further, in such implementations, network device 140 may include a gateway or proxy device positioned between the parties involved in the conversation. In this instance, conversation data (e.g., audio or text-based) may be captured and analyzed as it passes between the parties. Alternatively, one or more user devices 110-130 may forward conversation data to network device 140 for capturing/analysis in real time or at a time subsequent to the conversation.

Implementations described herein provide for identifying portions of conversations and retrieving information based on what is being discussed during the conversation. For example, items that are related to the context of the conversation and that may be relevant to the conversation may be retrieved. The retrieved items or information may then be displayed to a user and may also be forwarded to other parties involved in the conversation. This may also allow parties involved in conversations to interact more quickly and more fully during communication sessions. In addition, in some instances, the retrieved information may be used to initiate further communications.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to identifying various types of information from conversations and retrieving relevant information. In other implementations, other types of information may be identified or captured during a conversation and retrieved or forwarded in other ways.

In addition, features have been described above as involving content index logic 380 that indexes various content stored in content memory 370. In other implementations, content retrieve logic 340 may directly search the files in content memory 370 for context-related information. In such instances, content index logic 380 may not be needed.

Further, in some implementations, conversation monitor program 300 may alert the parties involved in a conversation that portions of the conversation are being captured and/or stored for later recall. For example, an audio or text alert may be provided to the parties of the conversation prior to conversation monitor program 300 identifying and storing portions of the conversation.

In addition, while series of acts have been described with respect to FIGS. 5 and 6, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device, comprising:
   a communication interface configured to send and receive communications associated with a communication session;
   a memory configured to store files;
   a display; and
   logic configured to:
     identify at least one term or phrase from the communication session,
     retrieve, from the memory, at least one file associated with the at least one term or phrase, and
     output, to the display, the at least one file,
   wherein the communication session comprises communications with an interactive voice response system, wherein the logic is further configured to:
   identify a request for information from the interactive voice response system and when retrieving the at least one file, the logic is configured to:
     automatically retrieve, from the memory, information in response to the request, and
     output, to the display, the retrieved information.

2. A computer-readable medium having stored thereon sequences of instructions which, when executed by at least one processor, cause the at least one processor to:
   monitor a communication session involving at least a first party;
   identify at least one term or phrase from the communication session;
   retrieve, from a first device associated with the first party, information relevant to the at least one term or phrase;
   automatically generate a message to forward, during the communication session, the retrieved information to a second device; and
   forward, with the message, the retrieved information to the second device via a network, wherein the communication session comprises a voicemail message left by a second party associated with the second device, the computer-readable medium further including instructions for causing the at least one processor to:
   play the voicemail message; and
   identify a request associated with the voicemail message, wherein when retrieving information relevant to the at least one term or phrase, the instructions cause the at least one processor to:
   retrieve information from the first device based on the request.

3. The device of claim 1, wherein the logic is further configured to:
   generate an index associated with information included in the files,
   search the index for the at least one term or phrase, and when retrieving the at least one file, the logic is configured to:
   retrieve the at least one file based on results of the search.

4. The device of claim 1, wherein the logic is further configured to:
   perform speech recognition associated with input provided by the interactive voice response system.

5. The computer-readable medium of claim 2, wherein when identifying at least one or phrase from the communication session, the instructions cause the at least one processor to identify a topic associated with the communication session based on a term or phrase that was used a plurality of times during the communication session.

6. A method, comprising:
   receiving, at a first device associated with a first party, communications from a second device, the communications being associated with a communication session comprising a voicemail message or communications with an automated system;
   identifying at least one word or phrase from the communication session;
   retrieving, from a memory included in the first device, information associated with the at least one word or phrase;
   outputting, to a display associated with the first device, the retrieved information; and
   forwarding, during the communication session, the retrieved information to the second device via a network.

7. The method of claim 6, further comprising:
   receiving, from the first party and prior to forwarding the retrieved information, an indication to forward the retrieved information to the second device.

8. A device, comprising:
   a communication interface configured to send and receive communications associated with a communication session;
   a memory configured to store files;
   a display; and
   logic configured to:
     identify at least one term or phrase from the communication session,
     retrieve, from the memory, at least one file associated with the at least one term or phrase,
     output, to the display, the at least one file, and
   wherein the communication session comprises a voicemail message left for a user of the device by a first party, and wherein the logic is further configured to:
     forward, via the communication interface, the retrieved at least one file to a second device associated with the first party.

9. The computer-readable medium of claim 2, wherein when retrieving information, the instructions cause the at least one processor to:
   retrieve at least one of a text file, an audio file, an image file or a video file, and wherein the instructions further cause the at least one processor to:
   forward the retrieved at least one file to the second device.

10. The computer-readable medium of claim 2, the instructions further causing the at least one processor to:
    perform speech recognition on audio information provided during the communication session.

11. The computer-readable medium of claim 2, further comprising instructions for causing the at least one processor to:
    index information stored in a memory of the first device; and
    search the indexed information for the at least one term or phrase, and when retrieving information relevant to the least one term or phrase, the instructions cause the at least one processor to:
    retrieve information based on results of the search.

12. A computer-readable medium having stored thereon sequences of instructions which, when executed by at least one processor, cause the at least one processor to:
- receive communications associated with a communication session;
- identify at least one term or phrase from the communication session;
- retrieve, from a memory, at least one file associated with the at least one term or phrase; and
- output, to a display, the at least one file, wherein the communication session comprises communications with an interactive voice response system, and wherein the computer-readable medium further includes instructions for causing the at least one processor to:
- identify a request for information from the interactive voice response system, and when retrieving the at least one file, the instructions cause the at least one processor to:
- automatically retrieve, from the memory, information in response to the request, and
- output, to a display, the retrieved information.

\* \* \* \* \*